United States Patent [19]

Lazaravich et al.

[11] Patent Number: 5,524,223
[45] Date of Patent: Jun. 4, 1996

[54] INSTRUCTION ACCELERATOR FOR PROCESSING LOOP INSTRUCTIONS WITH ADDRESS GENERATOR USING MULTIPLE STORED INCREMENT VALUES

[75] Inventors: Robert V. Lazaravich, Chandler; Jill L. Kuester, Mesa, both of Ariz.

[73] Assignee: Motorola, Inc., Schaumburg, Ill.

[21] Appl. No.: 489,241

[22] Filed: Jun. 12, 1995

Related U.S. Application Data

[63] Continuation of Ser. No. 188,974, Jan. 31, 1994, abandoned.

[51] Int. Cl.⁶ .................................................. G06F 9/40
[52] U.S. Cl. ................. 395/375; 395/421.07; 395/421.1; 395/800
[58] Field of Search .................................... 395/375, 400, 395/800, 421.07, 421.1

[56] References Cited

U.S. PATENT DOCUMENTS

| | | | |
|---|---|---|---|
| 4,566,063 | 1/1986 | Zolnowsky et al. | 395/375 |
| 4,626,988 | 12/1986 | George | 395/375 |
| 4,773,038 | 9/1988 | Hillis et al. | 395/500 |
| 4,827,403 | 5/1989 | Steele, Jr. et al. | 395/800 |
| 4,935,867 | 1/1990 | Wang et al. | 395/421.07 |
| 5,083,267 | 1/1992 | Rau et al. | 395/375 |
| 5,113,370 | 5/1992 | Tomita | 395/375 |
| 5,121,498 | 6/1992 | Gilbert et al. | 395/200 |
| 5,193,202 | 3/1993 | Jackson et al. | 395/800 |
| 5,265,253 | 11/1993 | Yamada | 395/700 |
| 5,303,357 | 4/1994 | Inoue et al. | 395/375 |
| 5,367,651 | 11/1994 | Smith et al. | 395/700 |

*Primary Examiner*—Ken S. Kim
*Attorney, Agent, or Firm*—Kevin B. Jackson

[57] ABSTRACT

An instruction accelerator which includes an instruction source, and a single instruction multiple data array processor which executes the instructions supplied by the instruction source. A loop processor identifies all loop type instructions which are supplied by the instruction source, copies those instructions supplied by the instruction source into a loop memory, and supplies those loop instructions to the single instruction multiple data array processor in the order received, at the rate required by the single instruction multiple data array processor, and as many times as required by the loop count field.

15 Claims, 3 Drawing Sheets

INSTRUCTION ACCELERATOR FOR PROCESSING LOOP INSTRUCTIONS WITH ADDRESS GENERATOR USING MULTIPLE STORED INCREMENT VALUES

This application is a continuation of prior application Ser. No. 08/188,974, filed Jan. 31, 1994, now abandoned.

BACKGROUND OF THE INVENTION

The present invention relates, in general, to an apparatus and method for speed up of address generation, and more particularly to a method and apparatus for speed up of repetitive operations of hardware that incorporates linear single instruction multiple data (LSIMD) processing elements.

Just about any man-made product needs to be inspected or tested to assure that it functions correctly. In the past, most testing was done by humans. Today most testing is done using computer controlled machines. In the last 15 years technology has advanced to the point where computer controlled visual inspection is simple enough to be used in almost any manufacturing process. Still, one of the major factors limiting the use of electronic vision inspection is that most inspection systems take too much time to do an inspection. A visual inspection system that slows down an assembly line is one that typically will not be used.

A particular process used by electronic vision inspection systems to evaluate a camera image is extremely computationally intensive. A camera is used to capture an image which is transferred to an electronic memory for storage. The camera converts an image of an object into dots called pixels. A typical camera image is square and contains 512 rows and 512 columns. Each row contains 512 pixels and each column contains 512 pixels. This 512 by 512 image contains 512 times 512 or 262,144 pixels. Electronic vision inspection systems run special algorithms on these pixels to determine if the object represented by the image passes or fails testing. Testing of an image is slow because of the complexity of the algorithms and the large number of pixels in an image. In an attempt to speed up testing, most visual inspection systems use hardware that operates on several pixels at once. Ideally, the system would operate on all of the pixels in the image at once, however, this is not practical for reasons of the system's physical size and cost.

Most high performance visual inspection systems are implemented using LSIMD type architectures. LSIMD stands for Linear Single Instruction, Multiple Data. In other words, a single instruction, in this case a vision processing instruction, is supplied to an array of data processors that are connected and operate in parallel. When an instruction source supplies an instruction to the LSIMD array, each of the data processors in the LSIMD array reads the instruction and does the operation required by the instruction to their own pixel. The Linear part of LSIMD implies that the Single Instruction, Multiple Data array is constructed from a number of data processors equal to either the number of pixels in a row or the number of pixels in a column. A LSIMD array for a 512 by 480 image would therefore contain either 512 or 480 data processors depending on the implementation. A visual inspection system containing a LSIMD architecture tests a 512 by 480 image by sweeping the LSIMD array across the image horizontally or vertically one row or column at a time. Each new row or column that is operated on by the LSIMD array is accompanied by an address. This address selects which row or column of the image the LSIMD is to operate on.

An LSIMD array executes instructions received from a host computer or other instruction source. Identical instructions are used to process pixels in each row or column of the image. Some vision algorithms require a group of instructions to be repeated several times for each row or column in the image. Calculating all these instructions and addresses is slow and keeps the instruction source quite busy. This severely limits the time available for the instruction source to do the final evaluation of the processed image.

Many techniques have been used to increase processing speed of vision processing systems, but most have dealt with special algorithms, limiting the sections of the image to be processed, or increasing the speed capability of the instruction source and LSIMD hardware. It is relatively easy to increase the operating speed of a specially designed LSIMD array. However, increasing the speed of the instruction source is difficult and beyond certain limits, impossible. Typically the instruction source is a standard microprocessor. A state-of-the-art LSIMD array can generally be designed to be faster than the fastest microprocessor.

There is a need for a hardware enhancement to LSIMD type architectures that enables the instruction source to send one copy of repeating instructions to the LSIMD array. This enhancement should allow specially designed LSIMD arrays to operate at the full speed capability while at the same time relaxing the performance requirements of the instruction source.

DETAILED DESCRIPTION OF THE DRAWINGS

Figure 1:
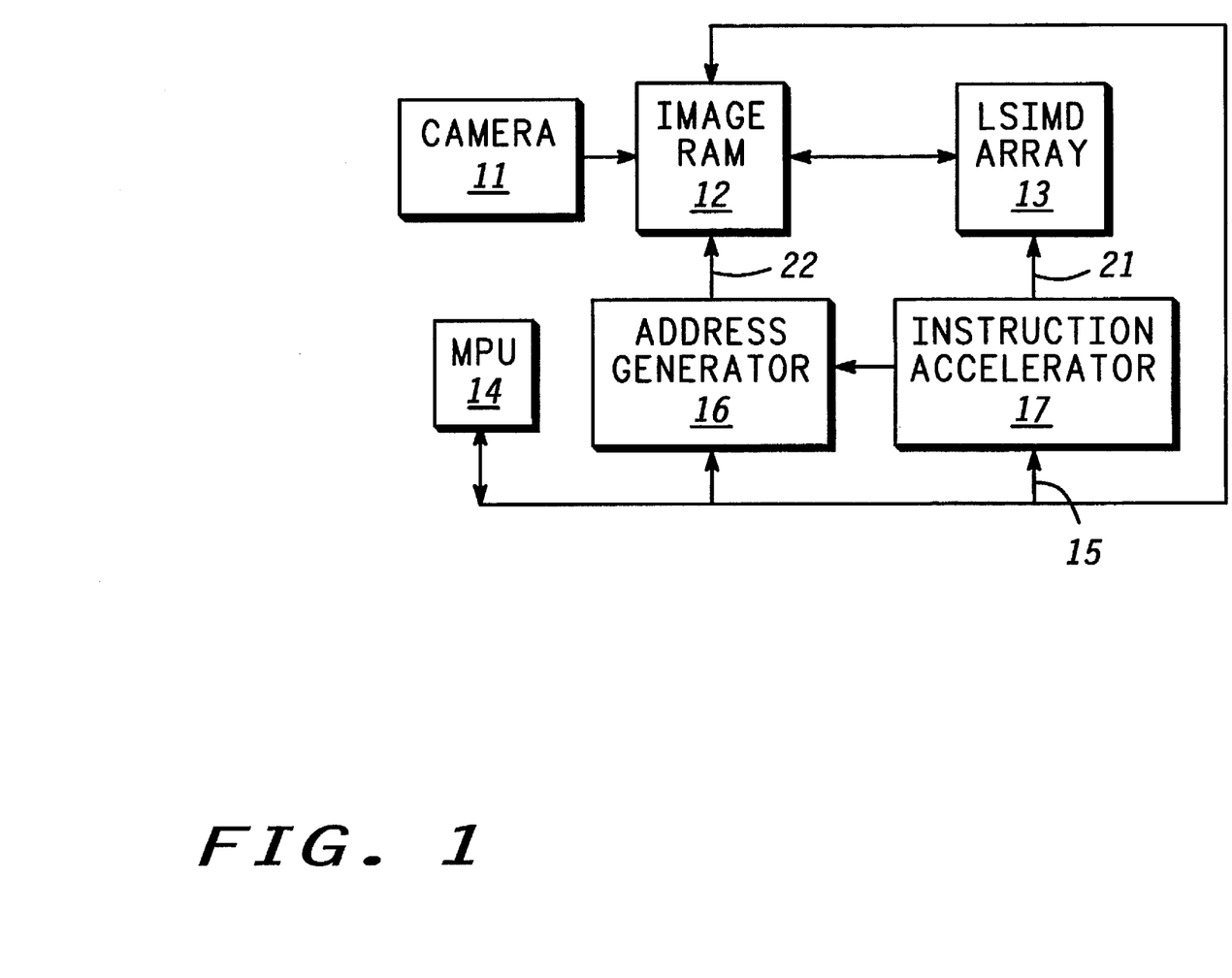
FIG. 1 is a system level diagram of a vision system.

FIG. 1 is a system level diagram of a vision system which incorporates a preferred embodiment in accordance with the present invention. A camera 11 captures an image which is stored in an image memory logic 12. An address generator 16 is used to calculate the next address 22 required by image memory logic 12. Address generator 16 is controlled by decoded instructions sent to instruction accelerator 17 from instruction source 14. Initial values for a RAM based look-up table used by address generator 16 are calculated by instruction source 14 and written directly into address generator 16. Address generator 16 supplies a sequence of addresses 22 to image memory logic 12. Addresses 22 determine which image and which portion of a captured image is to be processed by an LSIMD array 13. A FIFO based (First In First Out) instruction accelerator 17 is used to expand vision processing instructions 15 from instruction source 14 and supply them to the LSIMD array 13. Instruction accelerator 17 also decodes instructions from instruction source 14 which load, select, or increment a specific address in address generator 16.

LSIMD array 13 is an electronic circuit used in the present invention to operate on pixels of an image to be tested. The acronym LSIMD stands for Linear Single Instruction, Multiple Data array. Each single instruction provided by instruction source 14, is supplied to a plurality of data processors that are connected and operate in parallel within LSIMD array 13. When an instruction is supplied to LSIMD array 13, each of the data processors in LSIMD array 13 read the instruction and do the operation required by the instruction to a particular pixel. The Linear part of LSIMD implies that the Single Instruction, Multiple Data array is constructed from a number of data processors equal to either the number of pixels in a row or the number of pixels in a column. A LSIMD array for a 512 by 480 image would therefore contain either 512 or 480 data processors depending on the implementation. A visual inspection system containing a LSIMD architecture tests a 512 by 480 image by sweeping the LSIMD array across the image horizontally or vertically one row or column at a time.

Instruction source 14 is typically a computer system programmed to supply desired instructions. In this embodiment, the instruction source 14 is a host controller which controls the operation of the vision system by sending instructions to instruction accelerator 17. Instruction source 14 is also used to provide initial values for a RAM-based addition table contained in address generator 16 and to examine the results of vision processing operations performed by LSIMD 13 on previous images in image memory logic 12.

Overall system operation is as follows:

Initialization phase (done once after power turned on):
 a. Host controller 14 calculates an addition table and writes the table into the RAM based look-up table in address generator 16.
 b. Host controller 14 sends a reset signal to instruction accelerator 17 which clears the contents of all FIFOs in instruction accelerator 17.
 c. Host controller 14 sends a reset signal to address generator 16 to get its internal logic ready for operation.

Operating phase (done to test each image acquired by the camera)
 a. Host controller 14 sends instructions to instruction accelerator 17. These instructions are used to load the BASE address and increment values of a specific BASE address into address generator 16. The BASE address which is loaded represents the starting address in image memory logic 12 where the next image received from camera 11 will be saved.
 b. Host controller 14 requests that camera 11 acquire an image and send it to image memory logic 12.
 c. Camera 11 begins acquiring an image and sends it to image memory logic 12 one pixel at a time. Image memory logic 12 captures pixels from camera 11 in a temporary buffer until an entire row of 512 pixels has been received. At this point the 512 pixel wide image row is transferred to image memory logic 12 at the address specified by the address bus 22 which is output by address generator 16.
 d. Control logic in instruction accelerator 17 then signals address generator 16 to add a selected row increment value to the address currently being output on bus 22 in order to produce the next row address.
 e. The image acquire and save process continues until the image memory logic 12 signals host controller 14 that an entire image has been acquired.
 f. Host controller 14 goes into its instruction source mode of operation. Instructions are calculated and sent to instruction accelerator 17. Host controller 14 may temporarily suspend sending instructions to instruction accelerator 17 and begin evaluating the results of image processing on the current or previous images by reading or writing image memory logic 12. Instruction accelerator 17 will continue to process the instructions remaining in its internal buffer while host controller 14 examines processed images in image memory logic 12.
 g. As instructions are written to instruction accelerator 17 by host controller 14, hardware in instruction accelerator 17 examines each instruction and decodes it into four parts.
  1. A part containing a field that specifies the level of the current instruction.
  2. A part containing fields that are used by FIFO control logic 27 to control instruction accelerator 17.
   a. A field that causes a loop counter to be loaded.
   b. A field that causes a loop counter to be decremented.
   c. A field that indicates if the instruction is the last instruction of a loop of instructions.
   d. A field that indicates that instruction accelerator 17 should signal host controller 14. Host controller 14 uses this signal to determine when the LSIMD 13 has completed a specific part of image processing.
  3. A part containing fields used to control address generator 16.
   a. A field used to select which one of N addresses maintained by address generator 16 to output.
   b. A field that causes address generator 16 to add an increment value to the address currently selected.
   c. A field used to select an increment value for the address currently selected.
   d. A field used to load the base address of one of N addresses maintained by address generator 16.
   e. A field used to load an increment value of one of N addresses maintained by address generator 16.
  4. A part that is passed unchanged to the LSIMD array 13.

Instructions that are determined to be part of a loop are copied to one or more loop processors. The loop processors are used to repeat groups of instructions that together form a loop. In the preferred embodiment the loop processors are implemented using FIFO (First In First Out) devices. The loop processor inhibits supply of new instructions by the instruction source if the loop processors internal buffer memory is full.
 h. Instruction accelerator 17 continues to process instructions. Any groups of instructions that are determined to be part of a loop are repeated, as a group, by the loop processor FIFOs a number of times equal to the loop count. While the loop processor FIFOs are busy repeating a loop of instructions, host controller 14 continues to write additional instructions to instruction accelerator 17. These yet to be processed instructions are stored by instruction accelerator 17 in a level zero FIFO until the loop processors have finished looping.
 i. Eventually image processing completes and host controller 14 does a final evaluation of the processed image. Host controller 14 decides if the object represented by the image passes or fails the visual inspection. The result of the inspection is communicated by host controller 14 to an external source and host controller 14 requests that a new object be placed in the camera's field of view so that it also can be tested.

Figure 2:
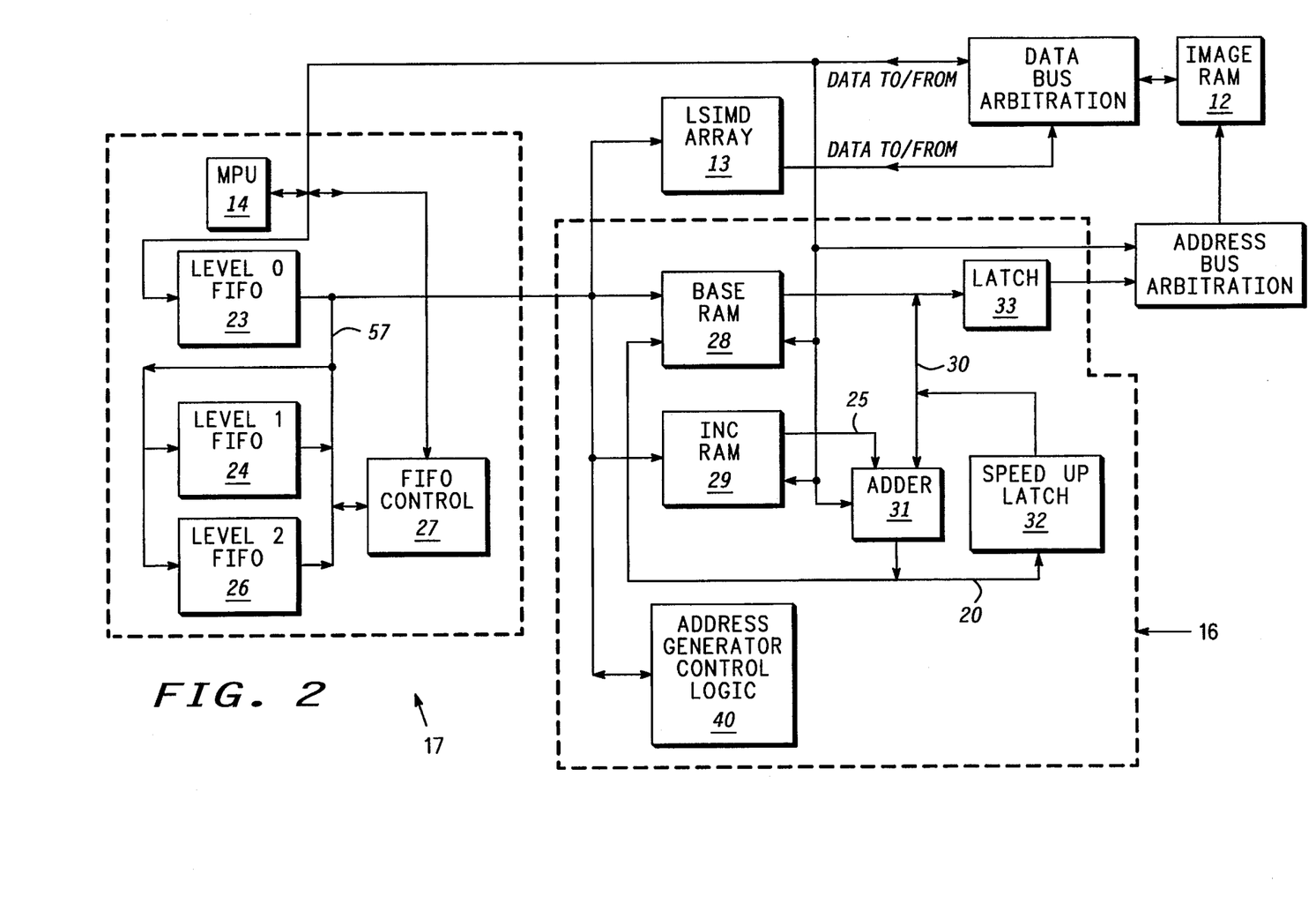
FIG. 2 is a diagram which illustrates the operation of a FIFO based instruction accelerator and an address generator.

FIG. 2 is a more detailed diagram which illustrates the operation of FIFO based instruction accelerator 17 and address generator 16. For simplicity, object numbers which appear in FIG. 1 are also used to refer to those same objects in FIG. 2. In this embodiment, standard FIFO (First In First Out) memories are used to implement the loop processors.

A plurality of loop processors is used, each loop processor recursively expanding loop instructions which are supplied by the next higher level loop processor. The re-transmit feature of the loop processor is used whenever a group of instructions needs to be repeated for a loop.

Whenever a loop processor detects that the current instruction is the last instruction of a loop, a re-transmit signal is generated if the loop counts are not zero. A base address memory 28 uses a dual ported memory as a buffer to store the address of the current pixel row or column. An increment memory 29 is used which allows storing of positive or negative increment or multiple increment values for base address memory 28. A speed up latch 32 stores the previous result from high speed adder 31. This allows high speed adder 31 to calculate the next result in advance.

A level 0 FIFO 23 acts as a buffer and receives instructions from host controller 14. The output of level 0 FIFO 23 is connected to the inputs of a level 1 FIFO 24 and a level 2 FIFO 26 by FIFO output bus 57. Additional FIFO levels may be added. When host controller 14 sends an instruction to instruction accelerator 17, the instruction is stored in the level 0 FIFO 23. The control logic 27 monitors the status of the level 0 FIFO 23 and operates a read cycle from the level 0 FIFO 23 whenever it contains an instruction. The read cycle causes the instruction saved in level 0 FIFO 23 to appear on output bus 57. As the instruction appears on output bus 57, FIFO control logic 27 simultaneously decodes fields in the instruction and signals the LSIMD array 13 (see FIG. 1) that an instruction is ready to be executed.

Listed below are possible actions FIFO control logic 27 may take as a result of decoding fields in the instruction just read from level 0 FIFO 23. One or more actions may occur.

1. If the instruction has a bit set in the level 1 FIFO load loop counter field, then the level 1 FIFO loop counter will be loaded with a loop count value.
2. If the instruction has a bit set in the level 2 FIFO load loop counter field, the level 2 FIFO loop counter will be loaded with a loop count value.
3. If the instruction is part of a level 1 FIFO loop, the instruction is written into the level 1 FIFO.
4. If the instruction is part of a level 2 FIFO loop, then instruction is written into the level 1 FIFO and into the level 2 FIFO.

As a general rule, if additional FIFO levels are added:
   If the current instruction's level number field indicates that the instruction's level is greater than level 0, the instruction is written into FIFO levels 1 through and including the level number indicated by the instruction's level number field.
5. If the instruction is determined to be the last instruction in a level 1 FIFO loop, FIFO control logic 27 disables further reading of instructions from level 0 FIFO 23 and enables reading of level one FIFO 24 to begin repeating the level 1 loop. Further instructions will be read from level 1 FIFO 24 until either the loop has been repeated the required number of times or a level 2 loop begins.
6. If the instruction has a bit set in a field called the PLUG field, FIFO control logic 27 signals host controller 14 that an instruction with the PLUG bit set was just executed. If host controller 14 is a microprocessor, this signal would probably be implemented as an interrupt. The PLUG signal is used to inform host controller 14 that instruction accelerator 17 and LSIMD array 13 (see FIG. 1) have just completed execution of a PLUG instruction. Host controller 14 uses this information to determine when specific parts of image processing have completed. If required, a level 0 PLUG instruction could halt further processing of instructions by instruction accelerator 17 until the PLUG signal is acknowledged by host controller 14.
7. Bits that control address generator 16 are decoded and sent to address generator 16 control logic 40.

Instructions passed to instruction accelerator 17 continue to be processed by level zero FIFO 23 and passed to LSIMD array 13 (see FIG. 1) until an instruction that is the last instruction of a level 1 FIFO loop is detected by FIFO control logic 27. When an instruction is determined to be the last instruction in a level 1 FIFO loop, FIFO control logic 27 disables further reading of instructions from level zero FIFO 23 and enables reading of level one FIFO 24. FIFO control logic 27 generates a read cycle for the level one FIFO 24. As the level 1 instruction appears on output bus 57, FIFO control logic 27 simultaneously decodes fields in the instruction and signals LSIMD array 13 (see FIG. 1) that an instruction is ready for it to execute. Listed below are possible actions FIFO control logic 27 may take as a result of decoding fields in the instruction just read from level 1 FIFO 24. One or more actions may occur.

1. If the instruction has a bit set in the level 2 FIFO load loop counter field, then the level 2 FIFO loop counter will be loaded with a loop count value.
2. If the instruction is part of a level 2 FIFO loop, the instruction is written into the level 2 FIFO.
3. If the instruction is determined to be the last instruction in a level 2 FIFO loop, FIFO control logic 27 disables further reading of instructions from the level 1 FIFO 24 and enables reading of level 2 FIFO 26 to begin repeating the level 2 loop. Further instructions will be read from level 2 FIFO 26 until the level 2 loop has been repeated the required number of times.
4. If the instruction is determined to be the last instruction of the level 1 loop, FIFO control logic 27 decrements the level 1 loop counter. If the loop counter is non-zero FIFO control logic 27 sends a re-transmit signal to level 1 FIFO 24 to cause level 1 FIFO 24 to repeat the loop of level 1 instructions. If the loop count is zero, FIFO control logic 27 disables further reading of instructions from level 1 FIFO 24 and enables reading of new instructions from level 0 FIFO 23. Simultaneously FIFO control logic 27 sends a reset signal to level 1 FIFO 24.
5. If the instruction has a bit set in a field called the PLUG field, FIFO control logic 27 signals host controller 14 that an instruction with the PLUG bit set was just executed. If host controller 14 is a microprocessor this signal would probably be implemented as an interrupt. The PLUG signal is used to inform host controller 14 that instruction accelerator 17 and LSIMD array 13 (see FIG. 1) has just completed execution of a PLUG instruction. Host controller 14 uses this information to determine when specific parts of image processing has completed.
6. Bits that control address generator 16 are decoded and sent to address generator 16 control logic 40.

FIFO control 27 continues to generate read signals for the level 1 FIFO until the required number of loops has completed or an instruction that is the last instruction in a level 2 FIFO loop is detected. When an instruction is determined to be the last instruction in a level 2 FIFO loop, FIFO control logic 27 disables further reading of instruction from level 1

FIFO 24 and enables reading of level 2 FIFO 26. Control logic 27 generates a read cycle for level 2 FIFO 26. As the level 2 instruction appears on output bus 57, FIFO control logic 27 simultaneously decodes fields in the instruction and signals the LSIMD array 13 (see FIG. 1) that an instruction is ready for it to execute. Listed below are possible actions FIFO control logic 27 may take as a result of decoding fields in the instruction just read from the level 2 FIFO. The following description assumes that the design contains only FIFO levels 0, 1 and 2 as shown in FIG. 2.

1. If the instruction is determined to be the last instruction of the level 2 loop, FIFO control logic 27 decrements the level 2 loop counter. If the loop counter is non-zero FIFO control logic 27 sends a re-transmit signal to the level 2 FIFO 26 to cause level 2 FIFO 26 to repeat the loop of level 2 instructions. If the loop count is zero, FIFO control logic 27 disables further reading of instructions from the level 2 FIFO 26 and enables reading of new instructions from the level 1 FIFO 24. Simultaneously the FIFO controller sends a reset signal to the level 2 FIFO 26.

2. If the instruction has a bit set in a field called the PLUG field, FIFO control logic 27 signals host controller 14 that an instruction with the PLUG bit set was just executed. If host controller 14 is a microprocessor this signal would probably be implemented as an interrupt. The PLUG signal is used to inform host controller 14 that instruction accelerator 17 and LSIMD array 13 (see FIG. 1) have just completed execution of a PLUG instruction. Host controller 14 uses this information to determine when specific parts of image processing have completed.

3. Bits that control address generator 16 are decoded and sent to address generator 16.

After completing a level 2 FIFO loop, FIFO control logic 27 disables level 2 FIFO 26 and enables level 1 FIFO 24. After completing a level 1 FIFO loop, FIFO control logic 27 disables level 1 FIFO 24 and enables the level zero FIFO 23. Instruction sequences that contain no loop instructions will only use the level 0 FIFO. FIFO levels higher than 0 are only used for processing loops of instructions.

As mentioned previously, each instruction received by instruction accelerator 17 from instruction source 14 is decoded into 4 parts.

1. A part containing one field that specifies the level of the current instruction.
2. A part containing fields used by FIFO control logic 27 to control instruction accelerator 17.
3. A part containing fields used to control address generator 16.
4. A part that is passed unchanged to the LSIMD array 13.

When instruction accelerator 17 signals LSIMD array 13 (see FIG. 1) that an instruction is ready for it to execute, address generator 16 must supply an image memory address that corresponds to the row of the image that the LSIMD instruction should operate on. Instruction accelerator 17 decodes a field in the instruction received from the instruction source (see step 3 above) and sends it to address generator 16 control logic 40. Address generator 16 control logic 40 decodes the instruction sent to it by instruction accelerator 17. Listed below are possible actions address generator 16 control logic 40 may take as a result of decoding the instruction received from instruction accelerator 17. One or more actions may occur.

1. A field containing the address information is decoded.
    a. A value is determined which is used as an index into the BASE address memory 28.
    b. A value is determined which is used as an index into the INCREMENT value memory 29.
    c. BASE address memory 28, is signaled to drive its output onto bus 30.
    d. The INCREMENT value memory 29 is signaled to turn on its output and drive bus 25.
    Go to step 2.

2. If the instruction has a bit set in the load BASE address field, address generator 16 control logic 40:
    a. Uses the value decoded in step 1a as an index into the BASE address memory 28 to select the BASE address that is to be updated.
    b. Writes the new BASE address value into the selected location of the BASE address memory 28.
    c. Does not change the output of the output latch 33.
    Go to step 6.

3. If the instruction has a bit set in the load INCREMENT value field, address generator 16 control logic 40:
    a. Uses the value decoded in step 1b as an index into the INCREMENT value memory 29 to select the INCREMENT value that is to be updated.
    b. Writes the new INCREMENT value into the selected location of the INCREMENT value memory 29.
    c. Does not change the output of the output latch 33.
    Go to step 6.

4. If the BASE address value decoded by step 1a is the same as the BASE address value in the previous instruction, address generator 16 control logic 40:
    a. Signals the BASE address memory 28, to disable its output from the driving bus 30.
    b. Signals the speed up latch 32 to drive its output onto bus 30.
    Go to step 5.

5. Address generator 16 control logic 40:
    a. Signals the output latch 33 to latch the current address value present on the speed up latch bus 30.
    b. Signals the speed up latch 32 to save the output of the high speed adder 31. This will be used as the next address if the BASE address value of the next instruction does not change.
    c. Signals the BASE memory 28 to save the output value of the high speed adder 31. This saves the current value of the BASE address in case the next instruction specifies a new base address.
    d. Signals the BASE address memory to disable its output from bus 30.
    e. Signals the speed up latch 32 to disable its output from bus 30.
    Go to step 6.

6. Wait for instruction accelerator 17 to supply the next instruction.

Figure 3:
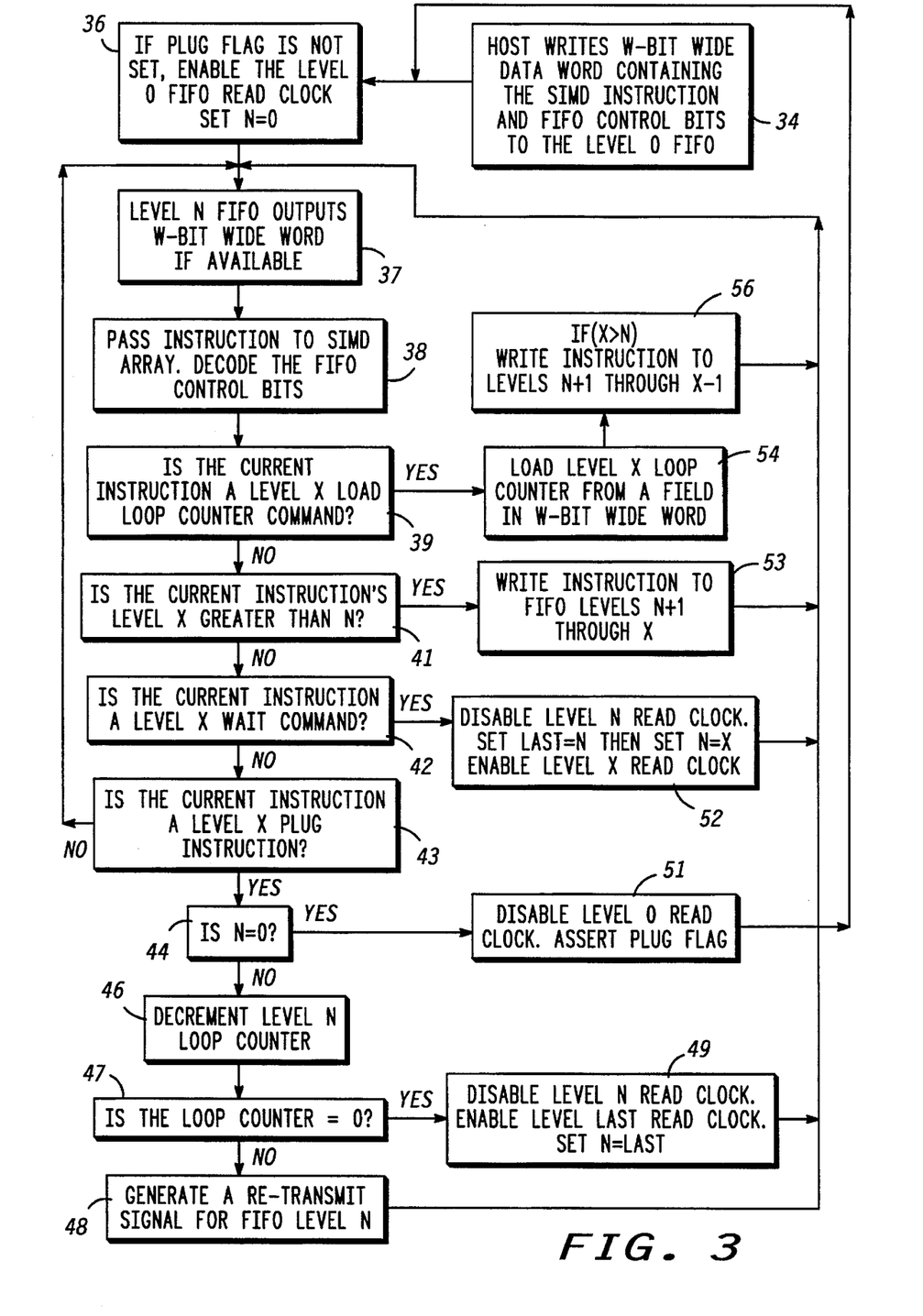
FIG. 3 is a flow chart which details the operation of an instruction accelerator.

FIG. 3 is a flow chart which details the operation of the preferred embodiment of instruction accelerator 17. For simplicity, object numbers which appear in FIGS. 1 and 2 are also used to refer to those same objects in FIG. 3. Each component of the flow chart is listed and described below.

34. Host controller 14 acting as an instruction source generates an instruction that contains 4 parts as shown below.

| INSTRUCTION LEVEL FIELD | INSTRUCTION ACCELERATOR FIELDS | ADDRESS GENERATOR FIELDS | INSTRUCTION FOR LSIMD ARRAY |
|---|---|---|---|
| a | b | c | d | a. A part containing one field that specifies the level of the current instruction.
b. A part containing fields that are used by FIFO control logic 27 to control instruction accelerator 17.
c. A part containing fields used to control address generator 16.
d. A part that is passed unchanged to LSIMD array 13.

After the instruction is generated, it is written to level 0 FIFO 23 in instruction accelerator 17.

36. FIFO control logic 27 examines a state of a flag called the PLUG flag. If the PLUG flag is asserted, FIFO control logic 27 suspends further operations and waits for the PLUG flag to be acknowledged and negated by host controller 14. The PLUG flag is used to inform host controller 14 that instruction accelerator 17 and LSIMD array 13 have just completed execution of a level zero PLUG instruction. Host controller 14 uses this information to determine when specific parts of image processing have completed.

When the PLUG flag is negated, FIFO control logic 27 enables the read logic for level zero FIFO 23. For purposes of description a variable N which represents the current FIFO level number is set to zero. Go to step 37.

37. FIFO control logic 27 examines the level N FIFO empty flag. If the level N empty flag indicates that an instruction is available, FIFO control logic 27 generates a level N read signal. The read signal causes the level N FIFO to output an instruction. Go to step 38.

38. FIFO control logic 27 separates the instruction into 4 parts.
   a. A part which specifies the level of the current instruction.
   b. A part containing fields that is used by FIFO control logic 27 to control the operation of instruction accelerator 17.
   c. A part containing fields used by address generator 16.
   d. A part that is passed unchanged to LSIMD array 13.

The part of the instruction used by LSIMD array 13 is passed directly to LSIMD array 13 for execution.

The part of the instruction used by address generator 16 logic is passed to address generator 16 control logic.

The part of the instruction used by instruction accelerator 17 is decoded. Go to step 39.

39. If the part of the decoded instruction used by the FIFO accelerator indicates that a loop counter is to be loaded, go to step 54, else go to step 41.

54. The loop counter specified by step 39 is loaded. Go to step 56.

56. If the instruction which specifies the load loop counter command (step 39) has a level field value of x which is greater than the current level (N), a copy of the entire current instruction must be written to FIFO levels N+1 through level x−1. As an example, if the current instruction was read from FIFO level zero (N=O) and the current instruction specified that the level three (x=3) loop counter was to be loaded, the current instruction would be written to FIFO levels 1 and 2 (N+1 through x−1).

Whenever the instruction level field has a value greater than the current level N, the instruction is part of a loop of instructions and must be written to all FIFO levels that need to process the loop. Go to step 37.

41. If the level field of the decoded instruction specifies a level x which is greater than the current level N, go to step 53, else go to step 42.

53. The current instruction which was read from the level N FIFO is written to FIFO levels N+1 to the level specified in the level field of the current instruction.

Whenever the instruction level field has a value greater than the current level N, the instruction is part of a loop of instructions and must be written to all FIFO levels that need to process the loop. Go to step 37.

42. If the decoded instruction specifies a WAIT command, go to step 52, else go to step 43.

52. Enable loop processor. For purposes of description only, set the current level Last=N. The read enable signal for the level N FIFO is disabled.

The read enable signal for the FIFO level specified by the instruction level field is enabled.

The WAIT command is used to enable a higher level FIFO to start processing a loop of instructions. FIFO control logic 27 remembers the current level (Last=N) so that when the higher level FIFO completes looping, the current FIFO can be enabled to continue processing new instructions from where it left off. Go to step 37.

43. If the current instruction specified a PLUG command, go to step 44, else go to step 37.

44. Which FIFO level was the current instruction read from? If it was read from the level zero FIFO go to step 51, else go to step 46.

51. The current FIFO level is zero and the current instruction specifies a PLUG command. FIFO control logic 27 disables the level zero FIFO read logic, asserts the PLUG flag and signals host controller 14 that a level zero PLUG instruction has been executed.

This command is used to signal host controller that a specific section of image processing has completed. Host controller generated the PLUG instruction and is expecting a signal from instruction accelerator 17 when the PLUG instruction has been executed. Go to step 36.

46. The loop counter for the current level (N>0) is decremented. Go to step 47.

47. If the loop counter is zero go to step 49, else go to step 48.

49. Disable loop processor to restore previous FIFO level. Disable the read logic for the current FIFO level N. For purposes of description only, set N=Last. (See step 52). Enable the read logic for the previous FIFO level Last. Go to step 37.

48. Current loop processor has just completed another loop. Further loops are required because the loop count was not zero. FIFO control logic 27 signals the current FIFO level to execute a re-transmit operation. This causes the FIFOs which implement the loop processors to reset their internal pointers to the beginning of the loop. Further reads from the FIFO will cause the loop of instructions to be repeated. Go to step 37.

By now it should be clear that the present invention provides a hardware enhancement to LSIMD type architectures that enables the instruction source to send one copy of repeating instructions to the LSIMD array. Where previously the instruction source was required to supply each instruction with an image row address now only a starting address and increment/decrement value is necessary. This enhancement typically provides up to a 200 times reduction in time required to do identical vision operations and allows specially designed LSIMD arrays to operate at the full speed capability. Overall system performance is far superior to the same systems without the enhancement. With this enhancement, the instruction source is able to calculate instructions far ahead of the time when they will be executed by the LSIMD array. The instruction source gets far enough ahead of the LSIMD array that it has significantly more time to do the essential post-processing of previously processed images.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. A structure for use with a single instruction multiple data array processor, comprising:

an instruction source that supplies a plurality of instructions, wherein the plurality of instructions includes instructions comprising loops;

an instruction accelerator including a FIFO type memory buffer and a first level FIFO type memory, wherein the FIFO type memory buffer stores the plurality of instructions from the instruction source, and wherein instruction accelerator identifies a first level instruction comprising a loop and stores one copy of the first level instruction comprising a loop in the first level FIFO type memory, and wherein the first level FIFO type memory repetitively supplies the first level instruction comprising a loop to the single instruction multiple data array processor in an order received, at a rate required by the single instruction multiple data array processor, and as many times as specified by a first loop count value supplied by the instruction source thereby expanding the first level of instructions comprising a loop, wherein the instruction accelerator frees up the instruction source to perform other tasks; and an address generator that provides addresses to fetch data for the single instruction multiple data array processor to operate on when the structure is coupled to a source of data, the address generator coupled to the instruction source.

2. The structure of claim 1 further comprising:

a second level FIFO type memory coupled to the first level FIFO type memory and the FIFO type memory buffer, wherein the instruction accelerator identifies a second level instruction comprising a loop and stores one copy of the second level instruction comprising a loop in both the first level FIFO type memory and the second level FIFO type memory, and wherein the second level FIFO type memory repetitively supplies the second level instruction comprising a loop to the single instruction multiple data array processor in an order received, at a rate required by the single instruction multiple data array processor, and as many times as specified by a second loop count value supplied by the instruction source thereby expanding the second level of instructions comprising a loop.

3. The structure of claim 1 wherein the address generator comprises:

a dual ported base address memory that stores a plurality of base addresses, the dual ported base address memory coupled to the instruction accelerator and a source of data for the single instruction multiple data array processor to operate on, the dual ported base address memory providing an address for data when an instruction from the instruction accelerator specifies a new location in the dual ported base address memory;

an increment memory that stores an increment value corresponding to each of the plurality of base addresses stored in the dual ported base address memory, the increment memory capable of storing a plurality of increment values, wherein the increment memory is coupled to the instruction accelerator; and a high speed adder for adding an increment value to a corresponding base address value to provide an incremented result, the high speed adder coupled to the increment memory and the dual ported base address memory, wherein the high speed adder provides the incremented result to the dual ported base address memory and to a speed up latch, and wherein the speed up latch provides the incremented result corresponding to a next address for data fetching when a next instruction from the instruction accelerator specifies a location in the dual ported base address memory that equals an immediately preceding specified location in the dual ported base address memory, and wherein the instruction source supplies initial base address values for the dual ported base address memory and increment values for the increment memory and determines which set of base address and increment values are used by the high speed adder.

4. The structure of claim 1 wherein the instruction accelerator signals the instruction source to supply new instructions when the instruction accelerator has finished processing instructions comprising loops.

5. The structure of claim 1 wherein the address generator is connected to the FIFO type memory buffer so that the address generator receives instructions from the FIFO type memory buffer.

6. The structure of claim 1 wherein the instruction source is a computer system programmed to supply desired instructions.

7. An address generator for providing an address for data fetching comprising:

an instruction source that provides a plurality of instructions;

a source of data;

a base address memory which stores a plurality of base addresses supplied by the instruction source, wherein the base address memory provides the address for data fetching from the source of data when an instruction from the instruction source specifies a new location in the base address memory;

an increment memory which stores an increment value which corresponds to each of the plurality of base addresses stored in the base address memory, the increment memory capable of storing a plurality of increment values supplied by the instruction source, wherein the increment memory provides an increment value according to the instruction from the instruction source;

a high speed adder which adds the increment value to the address to provide an incremented result; and a speed up latch that stores the incremented result from the high speed adder, wherein the speed up latch provides a next address for data fetching from the source of data when a next instruction from the instruction source specifies a location in the base address memory that matches an immediately preceding specified location in the base address memory, wherein the next address provided by the speed up latch corresponds to the incremented result.

8. The address generator of claim 7 wherein the high speed adder comprises a RAM based look up table.

9. The address generator of claim 7 wherein base address memory comprises a dual ported memory.

10. The address generator of claim 7 wherein the increment memory allows storing of negative increment values.

11. The address generator of claim 7 wherein the increment memory allows storing of multiple increment values for each base address.

12. The address generator of claim 7 wherein the instruction source is an instruction accelerator.

13. An image processing system having a single instruction multiple data (SIMD) array process or comprising:

a camera for capturing an image;

an image memory for storing the image, the image memory coupled to the camera;

an instruction source for controlling operation of the image processing system, wherein the instruction source provides instructions including loop instructions that are groups of instructions to be repeated as a group, base address values and increment values;

an address generator for supplying addresses to the image memory to fetch data for the SIMD array process or to operate on, the address generator coupled to the image memory and the instruction source, wherein the address generator includes a base address memory for storing the base address values, an increment memory for storing an increment value that corresponds to each base address value stored in the base address memory, a high speed adder that adds the increment value to a specific base address stored in the base address memory to provide an incremented result, wherein the incremented result is stored in the base address memory and a speed up latch, and wherein the speed up latch provides the incremented result corresponding to a next address for data fetch when a next instruction specifies a location in the base address memory that matches a just prior specified location in the base address memory;

an SIMD array processor for processing the image stored in the image memory according to instructions sent by the instruction source, the SIMD array processor coupled to the image memory; and an instruction accelerator including a FIFO type memory buffer, a plurality of FIFO type memories, and a FIFO type control device, wherein the FIFO type memory buffer stores instructions from the instruction source, and wherein the FIFO type control device identifies the loop instructions, and wherein each loop instruction is copied once from the FIFO type memory buffer into one or more of the plurality of FIFO type memories, and wherein one of the one or more of the plurality of FIFO type memories repetitively supplies the loop instructions to the SIMD array processor in an order received, at a rate required by the SIMD array processor, and as many times as specified by the instruction source thereby expanding the loop instructions, and wherein the instruction accelerator is coupled to the instruction source, the SIMD array processor, and the address generator.

14. An apparatus for enhancing performance of an instruction source and an SIMD array processor comprising:

1) an instruction accelerator including,
 a) a FIFO control device;
 b) a FIFO type memory buffer coupled to the instruction source, the FIFO control device, and the SIMD array processor, wherein the FIFO type memory buffer stores and synchronizes instructions supplied by the instruction source; and
 c) a first FIFO type memory coupled to the FIFO type memory buffer, wherein the first FIFO type memory stores first level instructions comprising a loop that are identified by the FIFO control device and supplied by the FIFO type memory buffer, and wherein the first level instructions comprising a loop include a group of instructions to be repeated as a group, and wherein the first level instructions comprising a loop are copied once in the first FIFO type memory, and wherein the first FIFO type memory repetitively supplies the first level instructions comprising a loop to the SIMD array processor a number of times as specified by a first loop count value; and 2) an address generator that provides addresses to fetch data for the SIMD array processor to operate on according to instructions provided by the instruction accelerator, the address generator including,
 a) a base address memory that stores a plurality of base addresses, the base address memory coupled to the instruction accelerator and a source of data for the SIMD array processor to operate on, the base address memory providing an address for data when an instruction from the instruction accelerator specifies a new location in the base address memory;
 b) an increment memory that stores an increment value corresponding to each of the plurality of base addresses stored in the base address memory, the increment memory capable of storing a plurality of increment values, wherein the increment memory is coupled to the instruction accelerator; and
 c) a high speed adder for adding an increment value to a corresponding base address value to provide an incremented result, the high speed adder coupled to the increment memory and the base address memory, wherein the high speed adder provides the incremented result to the base address memory and to a speed up latch, and wherein the speed up latch provides the incremented result corresponding to a next address for data when a next instruction from the instruction accelerator specifies a location in the base address memory that equals an immediately preceding specified location in the base address memory, and wherein the instruction source supplies initial base address values for the base address memory and increment values for the increment memory and determines which set of base address and increment values are used by the high speed adder.

15. A method for instruction acceleration and address generation for use with an SIMD array processor comprising the steps of:

1) providing a source of data for the SIMD array processor to operate on;

2) sending a plurality of instructions from an instruction source to an instruction accelerator, wherein the instruction accelerator includes a FIFO type memory buffer, a plurality of FIFO type memories for processing loop instructions, and a FIFO type control device, and wherein the plurality of instructions are first stored in the FIFO type memory buffer, and wherein the plurality of instructions includes loop instructions and address instructions, and wherein the instruction accelerator expands instructions to be used by the SIMD array processor, and wherein expanding instructions for the SIMD array processor includes the steps of,
 a) identifying a loop of instructions;
 b) storing one copy of the loop of instructions in one or more of the plurality of FIFO type memories; and
 c) repetitively supplying the loop of instructions to the SIMD array processor in an order received, at a rate required by the SIMD array processor, and as many times as specified by a loop count value;
3) sending the address instructions from the FIFO type memory buffer to an address generator to provide an address for data fetching, wherein the address generator includes a base address memory that stores a plurality of base address values, an increment value memory that stores a plurality of fixed increment values each corresponding to a base address value, a high speed adder, a speed up latch, and an address generator control device, and wherein providing the address for data fetching comprises the steps of, a) selecting a base address value from a specified location in the base address memory;
 b) selecting a fixed increment value from the increment value memory that corresponds to the selected base address value;
 c) adding the selected fixed increment value to the selected base address value using the high speed adder to provide an incremented result;
 d) storing the incremented result in the base address memory;
 e) storing the incremented result in the speed up latch;
 f) providing the address for data fetching, wherein the address for data fetching comprises one of the selected base address value and the incremented result; and
4) operating on data with the SIMD array processor according to instructions supplied by the instruction accelerator, wherein the data is fetched according to the address provided by the address generator.

* * * * *

UNITED STATES PATENT AND TRADEMARK OFFICE
CERTIFICATE OF CORRECTION

PATENT NO. : 5,524,223
DATED : June 4, 1996
INVENTOR(S) : Robert V. Lazaravich
 Jill Kuester It is certified that error appears in the above-indentified patent and that said Letters Patent is hereby corrected as shown below:

Claim 13, column 13, line 27
Delete "process or" and insert --processor-- therefor.

Signed and Sealed this

Twenty-first Day of October 1997

*Attest:*

BRUCE LEHMAN

*Attesting Officer*     Commissioner of Patents and Trademarks